Figure 1:
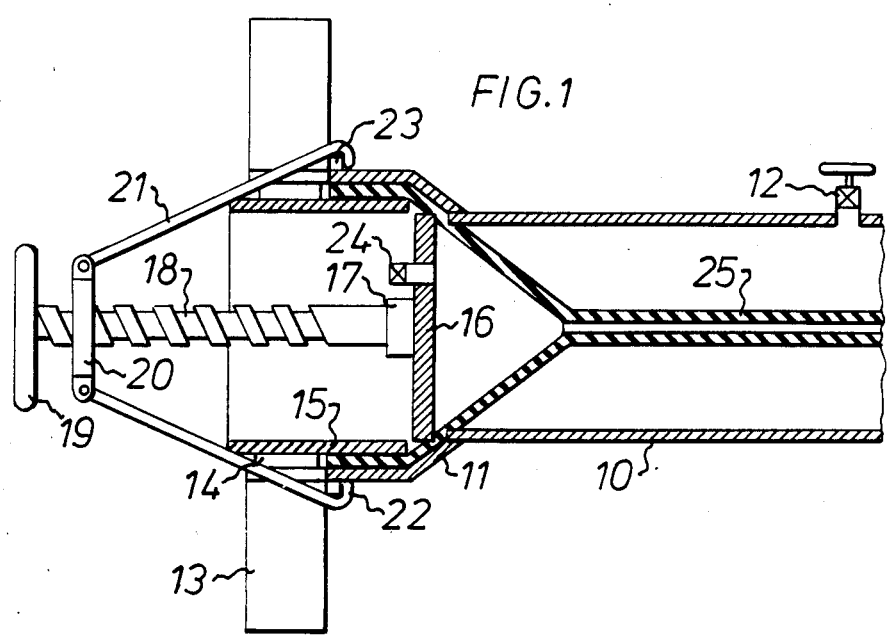

United States Patent [19]

Jensen

[11] Patent Number: 4,686,755
[45] Date of Patent: Aug. 18, 1987

[54] METHOD FOR ENCLOSING A BODY IN A RELATIVELY THICK ENCLOSURE OF ELASTIC MATERIAL

[76] Inventor: Mogens P. Jensen, Mörarpsgårdsvägen 8, S 26034 Mörarp, Sweden

[21] Appl. No.: 744,814

[22] PCT Filed: Oct. 29, 1984

[86] PCT No.: PCT/SE84/00361
§ 371 Date: Jun. 11, 1985
§ 102(e) Date: Jun. 11, 1985

[87] PCT Pub. No.: WO85/01912
PCT Pub. Date: May 9, 1985

[30] Foreign Application Priority Data

Oct. 28, 1983 [SE] Sweden .............................. 83059279

[51] Int. Cl.[4] .......................... B23P 11/02; B29C 49/00
[52] U.S. Cl. .................................... 29/450; 29/235; 264/510; 264/573
[58] Field of Search .................. 264/510, 573; 29/450, 29/235

[56] References Cited

U.S. PATENT DOCUMENTS

| 2,201,706 | 5/1940 | Sukohl | 264/510 X |
| 2,783,819 | 3/1957 | Duff | 264/573 X |
| 3,010,194 | 11/1961 | Fratzke | 29/450 X |
| 3,294,607 | 12/1966 | Rothermel et al. | 264/573 X |
| 3,611,536 | 10/1971 | Guenther et al. | 29/450 X |
| 4,291,454 | 9/1981 | Sawaryn | 29/450 X |

FOREIGN PATENT DOCUMENTS

| 177167 | 3/1922 | United Kingdom | 29/450 |
| 486132 | 5/1938 | United Kingdom | 29/450 |

Primary Examiner—Jan H. Silbaugh
Assistant Examiner—Neil Michael McCarthy
Attorney, Agent, or Firm—Shapiro and Shapiro

[57] ABSTRACT

A body is provided with a relatively thick coating of elastic material by first expanding a sleeve (25) of said material, which is closed at one end, under the action of compressed air into engagement with the inner side of a tight casing (10) surrounding said sleeve, while venting the closed space between said sleeve (25) and said casing (10) via a valve (12). By closing the valve (12), the sleeve (25) is maintained in its expanded state, and the body is inserted therein, whereupon air is again admitted into the said space by opening the valve (12) so that the sleeve (25) contracts around and firmly engages the body.

9 Claims, 2 Drawing Figures

U.S. Patent  Aug. 18, 1987  4,686,755

METHOD FOR ENCLOSING A BODY IN A RELATIVELY THICK ENCLOSURE OF ELASTIC MATERIAL

The present invention relates to a method of enclosing a body in a relatively thick enclosure of elastic material, especially rubber.

In many applications, there is a demand for rigid bodies made of, for example, wood, metal or concrete and having a relatively thick outer coating of rubber or other elastic material. Examples of such bodies are fenders of various types and rollers for roller conveyors. Providing these bodies with such a coating is difficult because considerable forces are required for expanding, for example, a rubber sleeve to such an extent that the body can be inserted therein, and for removing the expanders after the expansion. It is, of course, also conceivable to apply the coating by immersion of the body, or by vulcanization technique, but these methods are difficult and, above all, highly expensive.

A principal object of this invention is to eliminate the above-mentioned difficulties and to provide bodies with such a relatively thick external coating in a simple manner and at low cost. A further object of the invention is to enclose, in similar manner, liquid and gaseous bodies in a casing such that the casing exerts a considerable pressure on the body so that the body, if desired, can escape under pressure. These objects are attained according to a method of the invention wherein the enclosing material, in the form of a sleeve or the like which is open at one end and has a cavity of a cross-sectional area far smaller than that of the body, is inserted in a tight casing of rigid material. The open end of the sleeve is widened and tightly connected to the casing wall defining the entrance opening, and the widened sleeve end is tightly sealed by means of a sealing member that can be clamped thereagainst. Pressurized fluid is supplied to the cavity of the sleeve by means of a valve provided in said sealing member, while at the same time the air is vented from the space between the casing and the sleeve via a valve mounted in the casing wall. The supply of pressure fluid is continued until the outer side of the sleeve substantially engages the inner side of the casing, the valve in the casing wall then being closed so that the sleeve is maintained in its expanded state when the valve in the sealing member is opened and the sealing member is removed. The body is inserted in the expanded sleeve and the valve in the casing is opened, whereby the sleeve seeks to resume its original dimension and thus tightly and with considerable force engages and tends to compress the body. Finally, the widened end of the sleeve is loosened from the casing and, if necessary, is sealed, and the enclosed body is removed from the casing.

The invention also provides an apparatus for enclosing a body in a relatively thick enclosure of elastic material, especially rubber, said apparatus being characterized by a casing of rigid material, such as steel, which has been dimensioned on the basis of the dimensions of said body and said enclosure and which is open at one end but otherwise is closed, and into which the enclosing material can be inserted in the form of a sleeve or the like open at one end; a clamping device mounted at the open end of said casing and movable into engagement with the open end of said sleeve to clamp said end into tight engagement with the wall portion defining the opening of said casing; a sealing member which can be tightly clamped in the sleeve opening clamped against the said wall; a valve provided in said sealing member and connectible to a pressure fluid source for supply of pressure fluid to the cavity of said sleeve for widening said sleeve into engagement with the inner side of said casing; and a valve provided in the casing wall for withdrawing air from the space between said casing and said sleeve upon said widening, said valve being closable when said sleeve has been widened into engagement with the inner side of said casing to maintain said sleeve in the widened state, and again openable when the body, after removal of said sealing member, has been inserted in said sleeve, such that said sleeve can contract to tightly enclose said body.

Figure 2:
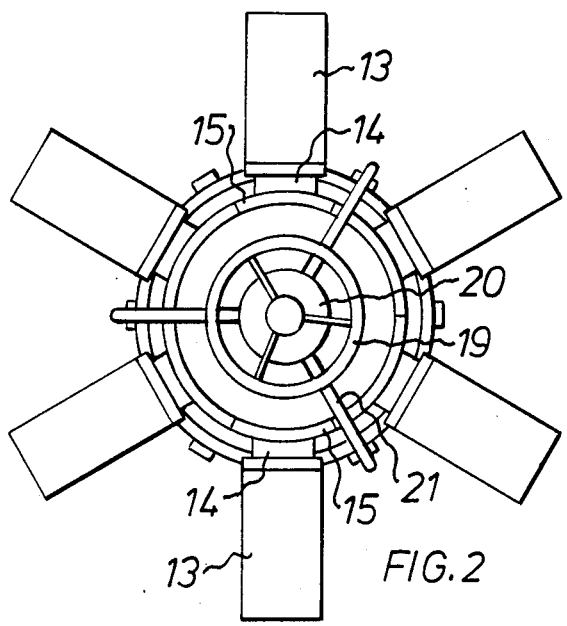

The invention will be described in more detail below, reference being had to the accompanying drawing which illustrates schematically an embodiment of the invention and in which FIG. 1 is a lateral sectional view of an apparatus for coating rigid bodies with elastic material, while FIG. 2 shows the apparatus according to FIG. 1 from one end thereof.

As has been mentioned by way of introduction, it is an object of this invention to enclose a body in a "relatively thick" enclosure of elastic material, especially rubber. By the phrase "relatively thick" in the subsequent description and in the claims is meant a coating that can be expanded only by exerting considerable force, which normally means a wall thickness exceeding about 2 mm for the rubber compounds most frequently employed. In the following discussion, an apparatus will be described which is especially intended for coating elongate bodies, for example long fenders for use along quays. It will be appreciated, however, that the principle of the invention is applicable also to other types of bodies, and also to liquid and gaseous bodies.

FIG. 1 shows a small part of a pipe 10 which is made of steel and is closed at the end not shown in the drawing. To the open end of the pipe 10, which is shown in the drawing, a collar 11 is welded which has a larger diameter than the casing 10. At a distance from the collar 11, the casing 10 is provided in its wall with a valve 12 which is readily opened and closed. As will appear from FIG. 2, clamping means 13 in the form of piston and cylinder units are radially attached to the collar 11 adjacent the open end thereof. It is not necessary that the clamping means 13 be in the form of piston and cylinder units; they may also consist of mechanical means, such as gear racks and pawls etc. The piston rods of the piston and cylinder units 13 are directed radially inwards and, for reasons that will be explained below, are provided with clamping jaws 15 within the collar 11. A sealing disc 16 which may also be in the form of a tapering body has a shape corresponding to the cross-sectional shape of the collar and the casing and a dimension corresponding approximately to the outer dimension of the casing 10. Disc 16 can be inserted in the collar 11 and clamped against the casing 10 by means of a shaft 18 rotatably mounted on the side of the disc 16 facing away from the casing in a bearing means 17, said shaft extending through a plate 20 having a threaded opening and, at its outwardly facing end, a handwheel 19 for rotation of said shaft. The plate 20 is anchored to the outer side of the collar 11 by means of arms 21 which, at their ends facing away from said plate 20, are provided with hooks 22. The arms 21 can be swung against the outer side of the collar 11 to enable the hooks to grasp lugs 23 mounted on the collar, as will appear from FIG. 1. For reasons that will be explained below, the sealing disc 16 is provided with a valve 24.

It is assumed that an elongate body is to be provided with a coating of relatively thick rubber, and to this end a rubber sleeve is chosen which has the requisite wall thickness and, in the relaxed state, a transverse dimension which is far below the outer transverse dimension of the body to be coated. The sleeve which is designated 25 in the drawing, naturally has a length adapted to the length of the body. First, one end of the sleeve is closed, for instance by bending the sleeve end and placing a clamping member over the bent portion. The sleeve 25 is inserted in the casing 10, from which the sealing disc 16 and its associated parts have been removed, until the open sleeve end is on a level with the open end of the collar 11. Next, the end of the sleeve 25 is widened, for example by moving two opposed clamping jaws 15 towards one another by means of said piston and cylinder units until they can be inserted in the opening of the sleeve 25, whereupon the clamping jaws 15 by means of said piston and cylinder units are caused to move away from one another thereby expanding the sleeve opening. After that, a second pair clamping jaws can be inserted in the sleeve opening, and finally all piston and cylinder units are activated, such that they pull the sleeve portion adjacent the sleeve opening into tight engagement with the inner side of the collar 11, as is shown in FIG. 1. Between the inner side of the casing 10 and the outer side of the sleeve 25, an airtight space has now been established, and this space is made to communicate with the atmosphere by opening the valve 12. After that, the sealing disc 16 is placed in the widened sleeve end, and after the hooks 22 have been placed around the lugs 23 in the manner shown in FIG. 1, the handwheel 19 is rotated, whereby the sealing disc 16 is tensioned inwards into engagement with the inner side of the widened end portion of the sleeve. In this manner, the interior of the sleeve is sealed against the atmosphere. A compressed air hose is then coupled to the valve 24, and by the supply of compressed air to the interior of the sleeve 25, the sleeve is expanded, while simultaneously the air is expelled from the said space between the sleeve and the casing via the valve 12. When the outer side of the sleeve 25 engages the inner side of the casing 10, the valve 12 is closed, which means that the sleeve 25 cannot resume its original shape when, after removal of the compressed air hose and opening of the valve 24, the sealing disc 16 is detached and removed. The body to be coated is now readily insertable in the widened sleeve 25, and when the valve 12 then is again opened and air flows into the said space, the sleeve 25 seeks to resume its original shape and thus contracts against the outer side of the body with considerable force. After the sleeve portion held by the clamping jaws 15 has been released by activation of the piston and cylinder units, the body can be removed from the casing 10 and now carries a coating which tightly encloses the body and, to all intents and purposes, cannot be removed without destroying either the body or the coating.

In the above embodiment, it is assumed that the casing 10 is closed at its other end, and that the sleeve 25 is closed by being folded at its other end. It is, however, also possible to effect this sealing of the casing 10 and the sleeve 25 in the same manner as at the first-mentioned end, i.e. by means of clamping members and a sealing disc so that a body can be inserted from either end of the casing 10, thereby to make the work more efficient.

As stated previously, the invention may also be used for enclosing liquid and gaseous bodies in a strong enclosure. After expansion of the rubber or plastic sleeve, the liquid or gaseous body is supplied via a valve of other supply means, and then the sleeve is allowed to contract in the manner described above. In contrast to the technique previously described, the open sleeve end must, in the latter case, be reliably sealed or connected to a suitable delivery valve so that the sleeve and the liquid or gaseous body enclosed therein can be used for discharging liquid or gas at high pressure.

The construction of the apparatus herein described is extremely simple and intended primarily for manual handling. However, the expert will appreciate that the coating work can readily be automated by using hydraulic or electric means and suitable control means. The invention thus is not restricted to the embodiment illustrated in the drawing and described above, but may be modified within the scope of the appended claims.

I claim:

1. A method of enclosing a body in a relatively thick enclosure of elastic material, especially rubber, comprising inserting a body of elastic material in the form of a sleeve and the like having an opening at one end and an internal cavity of cross-sectional area substantially smaller than that of the body to be enclosed into a tight casing of rigid material; widening said one end of the elastic body and sealingly securing the widened end to wall portions of the casing which define an entrance opening to the casing; sealing the widened end by clamping a sealing member thereagainst; expanding the elastic body toward the casing by supplying fluid under pressure to the cavity of the elastic body through a valve in the sealing member, and thereby forcing air from a space between the casing and the elastic body while venting the air via a valve mounted in a wall of the casing; continuing to supply the fluid until the outer side of the elastic body substantially engages the casing; closing the casing valve in order to prevent reentry of air between the expanded body and the casing and thereby maintain the elastic body in an expanded state and then removing the sealing member from the expanded elastic body and inserting the body to be enclosed into the expanded elastic body; opening the valve in the casing, whereby the elastic body seeks to resume its original dimension and thereby tightly and with considerable force engages and tends to compress the body inserted therein; releasing the widened end of the elastic body from the casing; and removing the body to be enclosed, with the elastic body enclosing the same, from the casing.

2. The method of claim 1, wherein said releasing includes loosening the widened end of the elastic body from the casing and sealing that end of the elastic body.

3. A method of enclosing a body in a relatively thick enclosure of elastic material such as rubber, comprising inserting a body of elastic material in the form of a sleeve and the like which has an opening at an end thereof and an internal cavity of a cross-sectional area substantially smaller than that of the first-mentioned body into a casing having rigid airtight walls and having valve means mounted to one of its walls and communicating between the interior and exterior of the casing; securing said one end of the elastic body to portions of the casing walls defining an entrance opening to the casing; sealing between said one end of the elastic body and the entrance opening of the casing in order to provide an airtight space between the elastic body and the walls of the casing, which space may be opened to the exterior of the casing by opening the valve means; sealing the cavity of the elastic body; expanding the elastic body toward the walls of the casing by introducing pressurized fluid into the sealed cavity of the elastic body with the valve means open to permit the expanding body to force fluid in the space between the elastic body and the casing walls out of the casing while venting the fluid via the valve means; closing the valve means after expansion of the elastic body in order to prevent reentry of fluid between the expanded body and the casing walls and thereby maintain the elastic body in an expanded state and then unsealing the cavity of the expanded elastic body and inserting the first-mentioned body into the expanded elastic body; reopening the valve means to admit fluid between the elastic body and the walls of the casing, whereby the expanded elastic body contracts against the first-mentioned body; releasing said one end of the elastic body from the entrance opening of the casing; and removing the first-mentioned body, enclosed by the elastic body, from the casing.

4. The method of claim 3, wherein said securing includes widening said one end of the elastic body, wherein said sealing between said one end of the elastic body and the entrance opening of the casing includes sealingly engaging the widened end of the elastic body against the casing wall portions defining the entrance opening, and wherein said sealing of the cavity includes inserting a sealing means in the widened end of the elastic body and clamping the sealing means against the widened end.

5. The method of claim 4, wherein said introducing includes supplying said fluid to the cavity of the elastic body through a valve of the sealing means.

6. The method of claim 5, wherein said inserting of the first-mentioned body includes removing the sealing means from the widened end of the elastic body while the elastic body is maintained in an expanded state with the valve means closed and inserting the first-mentiond body into the expanded elastic body through the widened end thereof.

7. The method of claim 6, wherein said releasing includes loosening the widened end of the elastic body from the entrance opening of the casing and sealing that end of the elastic body.

8. The method of claim 3, wherein said introducing of fluid under pressure is conducted until the elastic body substantially engages the casing.

9. The method of claim 3, wherein the casing has a second entrance opening and the elastic body has an opening at a second end thereof, said method further comprising securing the second end of the elastic body to the second entrance opening of the casing, sealing between the second end of the elastic body and the second entrance opening of the casing, with said sealing of the cavity including sealing the second opening of the elastic body.

* * * * *